United States Patent
Nihei et al.

(10) Patent No.: US 6,225,598 B1
(45) Date of Patent: May 1, 2001

(54) METHOD OF HIGH FREQUENCY PULSE ARC WELDING AND APPARATUS THEREFOR

(75) Inventors: Masayasu Nihei; Jin Onuki; Takao Funamoto; Izumi Sakurai; Akira Onuma, all of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/112,210

(22) Filed: Jul. 9, 1998

(30) Foreign Application Priority Data

Jul. 9, 1997 (JP) .................................... 9-183484

(51) Int. Cl.$^7$ .................................................. B23K 9/09
(52) U.S. Cl. ................ 219/137 PS; 219/130.51; 219/137 WM
(58) Field of Search .................. 219/137 PS, 130.5, 219/130.51, 137 R, 137 WM, 61

(56) References Cited

U.S. PATENT DOCUMENTS

| | | | |
|---|---|---|---|
| 3,598,954 | * 8/1971 | Iceland et al. | 219/130.51 |
| 3,679,866 | 7/1972 | Arikawa et al. | |
| 3,781,511 | * 12/1973 | Rygiol | 219/137 PS |
| 4,019,018 | * 4/1977 | Oishi et al. | 219/137 R |
| 4,861,965 | 8/1989 | Stava. | |
| 4,904,843 | * 2/1990 | Hori et al. | 219/137 PS |

FOREIGN PATENT DOCUMENTS

| | | |
|---|---|---|
| 42 33 818 A1 | 4/1994 | (DE) . |
| 1181717 | 2/1970 | (GB) . |
| 53-119758 | 10/1978 | (JP) . |
| 54-131548 | 10/1979 | (JP) . |
| 59-092169 | 5/1984 | (JP) . |

* cited by examiner

Primary Examiner—Clifford C. Shaw
(74) Attorney, Agent, or Firm—Antonelli, Terry, Stout & Kraus, LLP (57) ABSTRACT

In a method for high frequency pulse welding and an apparatus therefor, a highly directive arc can be obtained by eliminating the effect of the inductance of the welding cable, which tends to make the high frequency electromagnetic pinch force large. In a method and an apparatus for high frequency pulse arc welding which is performed by generating an arc between an inconsumable electrode or a consumable electrode arranged near a portion of a base metal to be welded and the base metal with main pulse current, when the main pulse current is shifted from ON to OFF, a reverse pulse current having a polarity opposite to the polarity of the main pulse is supplied between the electrode and the base metal to improve the stiffness (directivity) of the arc by making the rising and falling edges of the pulses steeper. A rail-car and a nuclear power plant obtained by the method are also provided.

16 Claims, 7 Drawing Sheets

METHOD OF HIGH FREQUENCY PULSE ARC WELDING AND APPARATUS THEREFOR

BACKGROUND OF THE INVENTION

The present invention relates to a novel method of high frequency pulse arc welding and an apparatus therefor.

It is known that, in a conventional high frequency pulse arc welding method, as the peak value of the high frequency pulse current is increased, a quenching force produced by electromagnetic force becomes larger, and, consequently, the stiffness of the arc and the pressure of the arc are increased. It is also believed that the vibration effect of the high frequency peak pulse current can decrease the grain size of a welding portion and reduce blowholes. However, the welding current used in actual welding includes a ripple current due to the inductance L of the welding cable, as shown in a typical apparatus in FIG. 12, and, accordingly, there is a disadvantage in that the effect of the high frequency pulse current cannot be obtained sufficiently.

Further, in a conventional direct current TIG arc welding method, a stiffness of the arc is obtained by a gas pinching force, using a mixed gas of argon and hydrogen for the shielding gas, as a means for giving the arc stiffness (directivity). This stiff arc is used for welding with a very narrow edge groove on austenitic stainless steels. However, this welding method cannot be used for the welding of ferritic stainless steels or certain other steels because of hydrogen embrittlement. Further, this welding method cannot be used for the welding of aluminum or aluminum base alloys because hydrogen tends to cause the formation of a blowhole. On the other hand, the conventional pulse welding cannot be applied to aluminum welding either because of the lack of cleaning action.

Arc welding methods and apparatuses based on the use of a high frequency pulse current are disclosed in Japanese Patent Application Laid-Open No. 53-119758, Japanese Patent Application Laid-Open No. 54-131548, and Japanese Patent Application Laid-Open No. 59-92169.

In the past, the pulse arc welding method has produced a small arc stiffness, and, consequently, it has been difficult to perform welding with a narrow weld edge groove and welding with a deep melting penetration.

SUMMARY OF THE INVENTION

An object of the present invention is to provide a method of high frequency pulse welding and an apparatus for high frequency pulse welding in which the effect of the inductance of the welding cable is eliminated, and wherein the high frequency electromagnetic pinch force is large, and a stiff arc and an effective cleaning action can be obtained.

Another object of the present invention is to provide a method of high frequency pulse welding and an apparatus for high frequency pulse welding which exhibits an excellent stiffness (directivity) and stability in the arc, and which is particularly capable of preventing the arc from burning on side walls of a very narrow weld edge groove having a gap smaller than 6 mm, and which is further capable of performing deep melting penetration welding and high speed welding of aluminum or aluminum base alloys. In addition to this, an object of the present invention is to provide a butt welded structure and a rail-car body structure manufactured by the method and the apparatus.

A further object of the present invention is to provide a structure made of a carbon steel or a low-alloy steel manufactured by butt welding with a narrow weld edge groove, and a nuclear power plant using the butt welded structures.

The present invention is characterized by the fact that, in a method of high frequency pulse arc welding which is performed by generating an arc between an electrode (inconsumable or consumable) arranged near a portion of a base metal to be welded, and the base metal with a main pulse current, the stiffness or directivity of the arc is improved by applying a reverse pulse current having a polarity opposite to a polarity of the main pulse current between the electrode and the base metal when the main pulse current is shifted from ON to OFF to make the rising and falling edges of the pulses steeper.

Making the rising and falling edges of the welding current pulses steeper is attributed to an increase in the quantity of the current per unit time, and so the quantity of the current per unit time is set so as to be not smaller than 50 A per 1 $\mu$second, preferably not smaller than 100 A per 1 $\mu$second, and a quantity of current above 200 A per 1 $\mu$second is particularly preferable. In order to do so, the welding load voltage is set to a voltage not lower than 60 V, and preferably to a voltage not lower than 80 V. The welding load voltage is preferably set to a voltage within a range of 60 to 200 V, and a welding load voltage set within a range of 80 to 160 V is particularly preferable.

The present invention is characterized by the fact that, in a method for TIG high frequency pulse arc welding with a very narrow weld edge groove having a weld edge gap width below 6 mm, a directive arc is produced between an inconsumable electrode and a base metal by a main pulse current to prevent a side-wall arc and to stably maintain the arc in the narrow weld edge groove.

A method for high frequency pulse arc welding of aluminum or an aluminum base alloy in accordance with the present invention is characterized by the fact that a cleaning action and a directive arc are produced by properly selecting a current conducting time period ratio of the main pulse current to the reverse pulse current, or a peak current ratio of the main pulse current to the reverse pulse current, to make deep melting penetration welding and high speed welding possible.

The present invention relates to an apparatus for high frequency pulse arc welding which comprises a welding power source for supplying a welding current; a converter for converting the welding current to a pulse welding current having a different polarity, the converter being composed of semiconductors, such as IGBT (insulated-gate bipolar transistor) elements or the like; and a control unit for controlling the welding peak current, the conducting current ratio and the peak current ratio as described above. Therein, it is preferable that the welding power source and the converter are physically separated and electrically connected using a welding cable or a coaxial cable extending between them.

The present invention is characterized by a method for high frequency pulse arc welding which is performed by generating an arc between an electrode (inconsumable or consumable) consumable electrode arranged near a portion of a base metal to be welded and the base metal with a main pulse current, wherein, when the main pulse current is shifted from ON to OFF, a reverse pulse current having a polarity opposite to the polarity of the main pulse current is supplied between the electrode and the base metal to make the arc directive by making the rising and falling edges of the main pulse current and the reverse pulse current steeper.

It is preferable that a current stopping period is provided during a period between the reverse pulse current and the main pulse current following the reverse pulse current. It is also preferable that a base current smaller than the main pulse current flows during a period between the reverse pulse current and the main pulse current following said reverse pulse current.

It is preferable that either of the peak values of the main pulse current and the base current and the current conducting time periods of the main pulse current and the base current are periodically varied. It is preferable that the main pulse current is varied with a frequency in a range of several Hz to several tens of Hz and the molten metal is stirred to prevent grain growth.

It is preferable that the reverse pulse current, the base current and the current conducting time period, as well as the current stopping period, can be independently varied.

The present invention is characterized by a method of high frequency pulse arc welding which is performed by generating an arc between an inconsumable electrode arranged near a portion of a base metal to be welded and the base metal with a main pulse current, while a filler wire is being supplied, wherein a directive arc is formed, and a reverse pulse current having a polarity opposite to the polarity of the main pulse is supplied between the electrode and the base metal to make the rising and falling edges of the main pulse current and the reverse pulse current steeper when the main pulse current is shifted from ON to OFF.

In a method for high frequency pulse arc welding of aluminum or an aluminum base alloy in accordance with the present invention, it is preferable that a cleaning action and a directive arc are produced by varying the current conducting time period ratio of the main pulse current to the reverse pulse current, or a peak current ratio of the main pulse current to the reverse pulse current, to make deep melting penetration welding and high speed welding possible.

It is preferable that the rise time and the fall time of said main pulse current are not longer than 50 μsec.

The present invention is characterized by an apparatus for high frequency pulse arc welding by which welding is performed by generating an arc between an electrode (inconsumable or consumable) arranged near a portion of a base metal to be welded and the base metal with a main pulse current, the apparatus comprising a welding power source for supplying the main pulse current; a high frequency converter for converting a direct current to a high frequency pulse welding current having a polarity opposite to the polarity of the direct current; and a control unit for applying a reverse pulse current having a polarity opposite to a polarity of the main pulse between the electrode and the base metal to make the arc directive by making the rising and falling edges of the main pulse current and the reverse pulse current steeper when the main pulse current is shifted from ON to OFF.

It is preferable that the welding power source and the high frequency converter are physically separated and electrically connected using a welding cable or a coaxial cable.

The present invention is characterized by a butt welded structure made of aluminum and an aluminum base alloy, wherein structural parts composing the butt welded structure are joined by forming a weld of the aluminum or aluminum base alloy inside an I-shaped weld groove having a gap not larger than 6 mm.

The present invention is characterized by a rail-car body structure made of an aluminum alloy, wherein all or part of the structural parts composing the rail-car body structure are joined by welding with an I-shaped weld groove having a gap not larger than 6 mm.

The present invention is characterized by a butt welded structure made of a carbon steel or a low-alloy steel, wherein structural parts composing the butt welded structure are joined by forming a weld metal of the carbon steel or the low-alloy steel inside an I-shaped weld groove having a gap not larger than 6 mm; and wherein stress relief annealing treatment after welding is omitted.

The present invention is characterized by a nuclear power plant comprising a nuclear reactor, a steam turbine, a condenser, a condensate demineralizer, and pipes connecting the components, the pipes being made of a carbon steel or a low-alloy steel, wherein the pipes have a butt weld structure, and are joined by forming a weld metal of the carbon steel and the low-alloy steel inside an I-shaped weld groove having a gap not larger than 6 mm; and wherein stress relief annealing treatment after welding is omitted.

Figure 12:
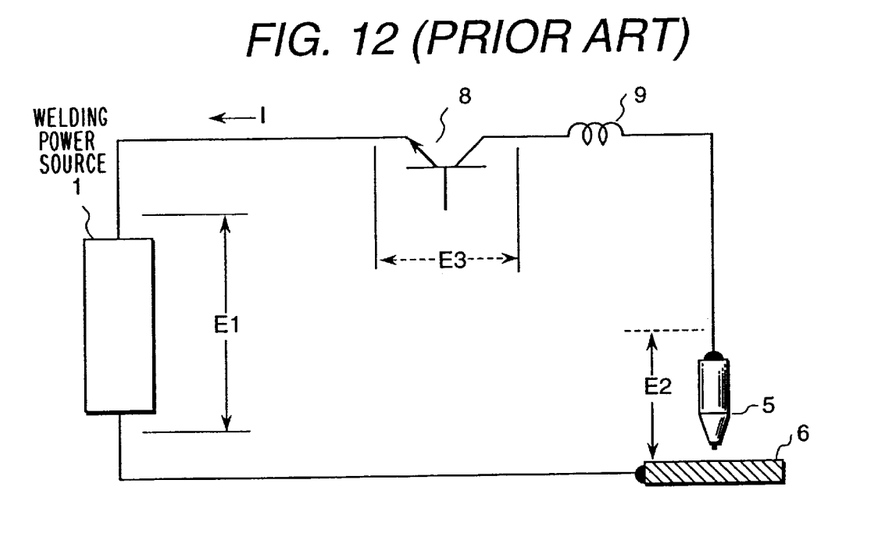
FIG. 12 is a schematic diagram showing the construction of an example of a pulse welder operating in accordance with a conventional method.

FIG. 12 is a schematic diagram showing a conventional pulse weld apparatus. The reference character 1 denotes a welding power source, the reference character 8 denotes a transistor for converting the welding power to a high frequency pulse current, and the reference character 9 denotes a floating inductance of a welding cable. Let a welding current flowing in the circuit when the transistor 8 is turned ON be I, a power source voltage of the welder be E1, an arc voltage be E2, and an ON voltage of the transistor be E3. Here, assuming that the arc voltage is a constant value determined by a welding condition and not depending on the welding current, the following equation holds when the component of resistance is neglected.

$$E1-E2-E3=L \cdot (dI/dt)$$

Therefore, the following equation holds.

$$I=[(E1-E2-E3)/L] \cdot t$$

Figure 1:
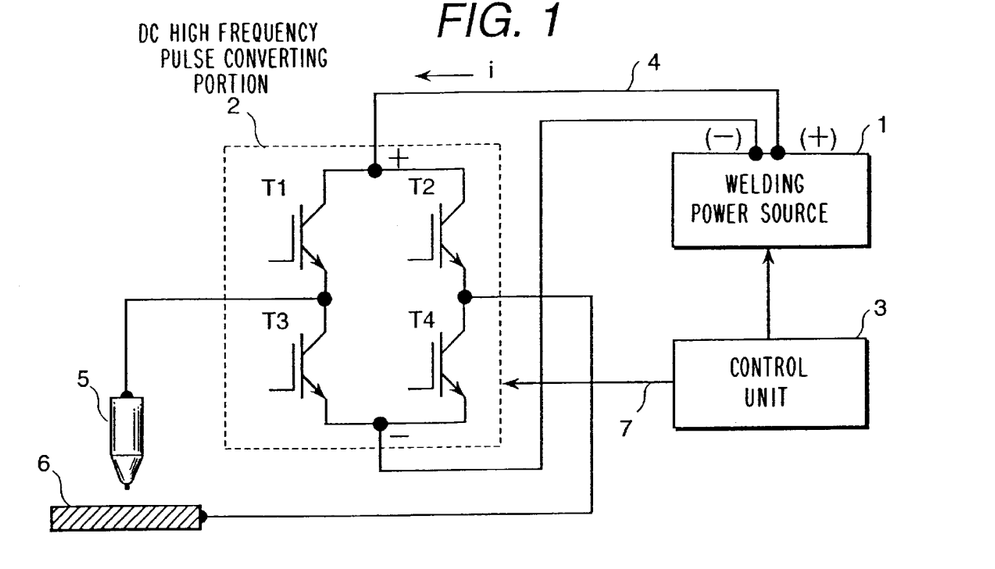
FIG. 1 is a schematic diagram showing the construction of a high frequency pulse welding apparatus in accordance with the present invention.
Figure 2:
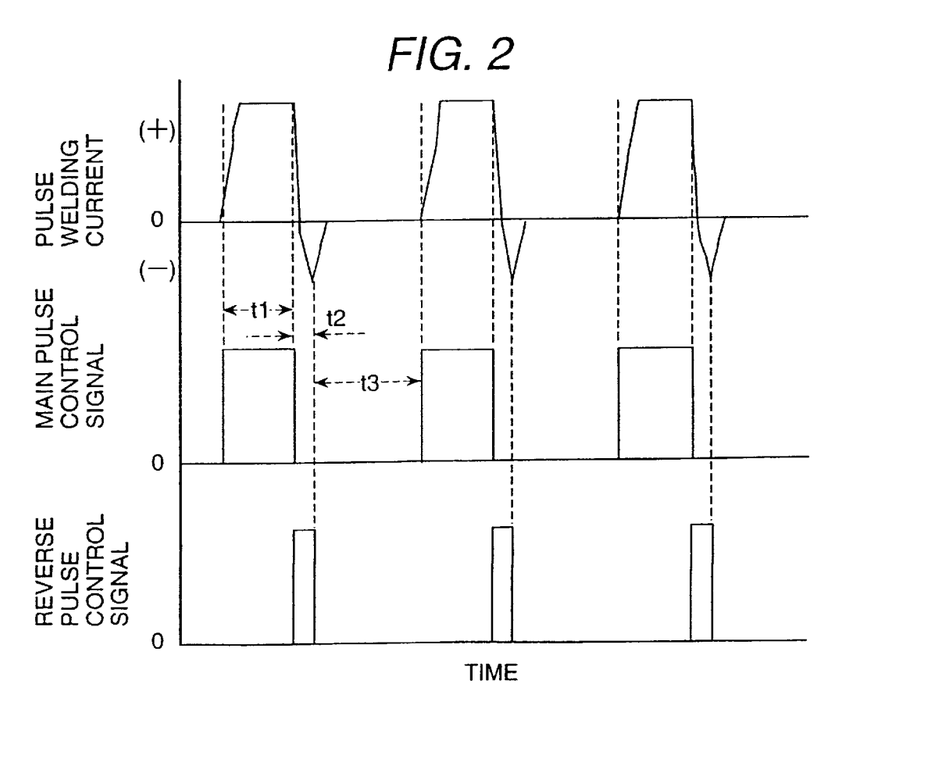
FIG. 2 is a pulse waveform diagram showing the waveform of a high frequency current pulse in accordance with the present invention.
Figure 13:
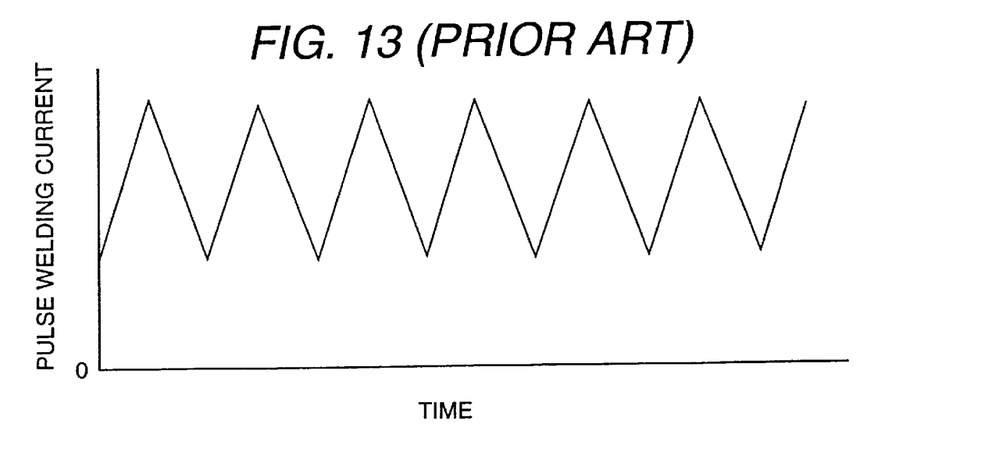
FIG. 13 is a waveform diagram showing the waveform of a high frequency pulse current produced by the conventional method.

It can be understood from the equation that the welding current does not increase steeply, but increases linearly at a constant speed. When the welding power source voltage, the welding load voltage and the transistor ON voltage are assumed to be invariable, an increase in the current is in inverse proportion to the inductance L. When the transistor is turned OFF, the current decreases with nearly the same gradient as the gradient which occurs at the time of current increase. That is, in the first aspect of the present invention, a voltage supplied to the arc load is increased in order to make the rising edge of a current pulse steeper, as can be understood from the equation, and a voltage (current) is applied in the reverse direction (reversing the polarity) to forcefully interrupt the main direction current in order to make the falling edge of a current pulse steeper, as shown in FIG. 2. Further, in regard to the falling edge of the reverse direction current, as the reverse direction voltage is higher or the reverse direction time t2 is longer, if the reverse direction voltage is constant, the effect becomes larger. As for the reversing of the polarity, the polarity is reversed by switching the direction of application of the voltage using four IGBT elements as shown in FIG. 1. In welding work for maintenance at a site such as where the welding of a cooling pipe in a nuclear plant occurs, the distance between the welder and the position of the welding work sometimes becomes 50 to 100 m. In such a case, since the effect of the inductance of the cable is too large in a conventional high frequency pulse weld system, the high frequency pulse current comes to have a ripple current waveform, as shown in FIG. 13, and the effect of the high frequency pulse current is hardly obtained. In accordance with the present invention, the problem can be solved by increasing the load voltage and reversing the polarity. However, in accordance with the present invention, in addition to this, the effect of the inductance of the cable is reduced by separating the welding power source and the high frequency pulse converting portion, placing the converting portion near the welding workplace and connecting the welding power source and the converting portion using a coaxial cable. When a base metal is at the negative polarity (during application of the reverse direction current), the base metal is cleaned because positive ions collide onto the base metal to remove the oxide film. However, since the depth of penetration becomes shallower during that period, the conducting time t2 of the reverse direction current (when the base metal is at the negative polarity) is preferably set to be shorter, except for the case of welding aluminum or an aluminum alloy. Therefore, it is necessary to set the conducting time t2 to a value within a range capable of obtaining an optimum waveform by observing the consumption of the electrode or the like.

In a continuous pulse current obtained by repeating the main pulse current, the reverse pulse current, the main pulse current, the reverse pulse current and so on, if the peak current is increased, the average current cannot be lowered because the average current is also increased corresponding to an increase of the peak current. Therefore, in accordance with the present invention, a current stopping period is provided between the reverse pulse current and the main pulse current following the reverse pulse current. The average current can be lowered by adjusting the current stopping time period to be longer even if the peak current is increased. This method is effective in the welding of thin plate, in which welding is performed with a small current, and in obtaining a desired stiffness of the arc and a stability of the arc in a weld with a very narrow edge groove.

In FIG. 2, when the main pulse current, the reverse current, and the current conducting times are fixed so as to be constant and a small current (a base current) flows during period t3 between the reverse direction current and the next main pulse current, the average current is increased. That is, the average current can be varied by changing the base current. In general, a high average current is required in welding thick plates. However, if the high average current is obtained only by increasing the peak current, the apparatus becomes expensive. Therefore, it is possible to weld thick plates by increasing the base current in the period t3 to increase the average current.

If the structure of a joined portion has grown into large grains, there are some cases where the boundary between the base metal and the joined portion cannot be clearly detected by ultrasonic wave inspection, which is a problem during inspection. Therefore, in accordance with the present invention, by varying the main pulse current, the base current, or any one of the current conducting times of the main pulse current and the base current with a period in a range of several Hz to several tens of Hz, the average arc pressure (average arc current) is varied to stir the molten metal, thereby preventing grain growth. In arc welding with a very narrow edge groove having a gap smaller than 6 mm, welding can be performed with an amount of input heat which is approximately ½ as small as that in arc welding with a common narrow edge groove having a gap of 8 mm. However, it is necessary for an arc current with a small input heat to be maintained in the very narrow weld edge groove. One method of welding with a very narrow edge groove is that an arc is stiffly concentrated by a pinch force of a mixed gas of argon and hydrogen to reduce the side wall arc (in some cases, helium gas is mixed, but the effect is small because of a weak pinch force). However, the method cannot be used for steel or a ferritic alloy, since hydrogen is used for the shield gas and causes hydrogen embrittlement. In the method of very narrow edge groove welding in accordance with the present invention, the average current can be lowered and the peak current can be increased by using a high frequency pulse arc welding current waveform, even if the inductance of the cable is large. Therefore, the arc is made stiff and the directive arc can be stably maintained even in welding with a very narrow edge groove and with a small heat input (welding current). Further, the method in accordance with the present invention can be applied to welding of steel or a ferritic alloy because hydrogen embrittlement is not caused.

The conventional pulse weld cannot be used for welding of aluminum because of the lack of a cleaning action and because a blowhole may be caused by the hydrogen. On the other hand, the pulse welding in accordance with the present invention can be used for welding of aluminum or an aluminum alloy because the polarity is alternately reversed and the oxide film can be removed by the cleaning action of argon when the polarity of the welded base metal is reversed to a negative polarity. In addition to this, it is possible to perform deep melting penetration welding and high speed welding by the action of the stiffness (directivity) of the high frequency pulse arc and by properly selecting the current conducting time period ratio of the positive polarity to the negative, polarity or the peak current ratio of the positive polarity to the negative polarity.

DETAILED DESCRIPTION OF THE EMBODIMENTS

Embodiment 1

FIG. 1 is a schematic diagram showing the construction of a high frequency pulse welding apparatus in accordance with the present invention. FIG. 2 is a waveform diagram showing the waveform of a high frequency current pulse in accordance with the present invention. Referring to FIG. 1, the pulse welding apparatus in accordance with the present invention comprises a DC welding power source 1, such as a high response power source of the inverter type, analog type, chopper type or the like; a DC high frequency pulse converting portion 2 for converting a direct current to a high frequency pulse current, the converting portion being composed of four IGBT switching elements T1 to T4; coaxial cables 4 connecting the welding power source 1 and the high frequency pulse converting portion 2; a control unit 3 for controlling the welding power source 1 and the DC high frequency pulse converting portion 2; and a control cable 7 for applying a signal to the bases of the IGBT elements.

Operation of the apparatus will be described below. When a main pulse control signal voltage as seen in FIG. 2 is input to the bases of the IGBT elements T2 and T3 from the control unit 3 and these IGBT elements are turned ON, a welding current i sequentially flows from a positive polarity terminal through IGBT T2, the base metal of objects 6 to be joined (arc load), a welding torch 5, IGBT T3 and returns to a negative polarity terminal. When a reverse pulse control signal voltage as seen in FIG. 2 is input to the bases of the IGBT elements T1 and T4 and these IGBT elements are turned ON, a welding current i sequentially flows from the positive polarity terminal through IGBT T1, the welding torch 5, the base metal of objects 6 to be joined (arc load), the IGBT T4, and returns to the negative polarity terminal. Therefore, the polarity at the welding portion is reversed. By periodically performing this operation, it is possible to obtain a continuous high frequency pulse current waveform having a steep falling edge as the ideal current waveform shown in FIG. 2. The current conducting time periods t1, t2, t3 and the peak current in the waveform are set by changing setting values of the signals produced by the control unit 3.

An example of application of the apparatus to very narrow edge groove welding will be described below. A welding test was conducted under the following conditions. The objects 6 to be joined were plates of carbon steel having a thickness of 30 mm. The other welding conditions were as follows. The gap width of the I-shaped weld edge groove was 3 mm (the beveling angle was 3 degrees); the shield gas was argon; the tungsten electrode was a flat electrode; the welding filler (carbon steel) wire had a 0.9 mm diameter; the welding load voltage was 120 V; the peak current was 500 A; and the current conducting time period t1 was 20 $\mu$sec (in the range of 5 to 100 $\mu$sec). The reverse pulse current was 500 A at maximum and the current conducting time period t2 of the reverse pulse current was set to 4 $\mu$sec (in the range of 1 to 50 $\mu$sec) so that the welding current waveform became an optimum waveform on observation. The current conducting time period t3 was 25 $\mu$sec (in the range of 10 to 200 $\mu$); the welding speed was 260 cm/min; the length of the coaxial cable connecting the DC high frequency pulse converting portion and the welding power source was 50 m; and the length of the cable connecting the DC high frequency pulse converting portion and the welding torch was 2 m. The result of welding under the above conditions was that the arc was stiff (directive) and stably maintained in the narrow edge groove and a good weld result was obtained. The current changing rate at the rise time and the fall time of the pulse in this embodiment was 200 to 300 A per 1 $\mu$sec. The reverse pulse current was approximately one half of the main pulse current.

A welding test was also conducted by the conventional method, but the test pieces could not be welded using a shield gas of solely argon, because of the occurrence of a side wall arc. Further, a welding test was also conducted by the conventional method while changing the shield gas to a mixed gas of argon and 50% helium, but the arc became unstable when the length of the arc fluctuated, and a joining fault occurred because of the narrow suitable range of the length of the arc. Furthermore, a series of tests by the method of the present invention were conducted by variously changing the gap width of the I-shaped weld edge groove, and the result showed that welding of a weld edge groove of 2.5 mm (with a beveling angle of 3 degrees) and a plate thickness of up to 30 mm was possible.

Figure 3:
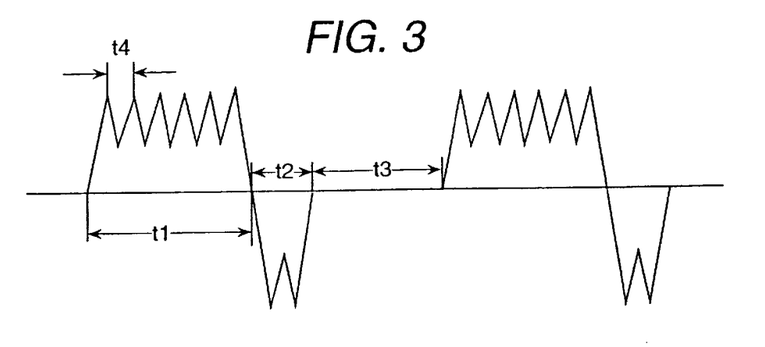
FIG. 3 is a waveform diagram showing the waveform of a high frequency current pulse in accordance with the present invention.

FIG. 3 is a waveform diagram showing a practical current waveform. The reference characters in the figure indicate the same corresponding current conducting time periods as seen in FIG. 2, respectively. Each of the peak pulse current and the reverse pulse current is composed of a plurality of waveforms, while each of the currents in FIG. 2 has a generally rectangular waveform.

Figure 4:
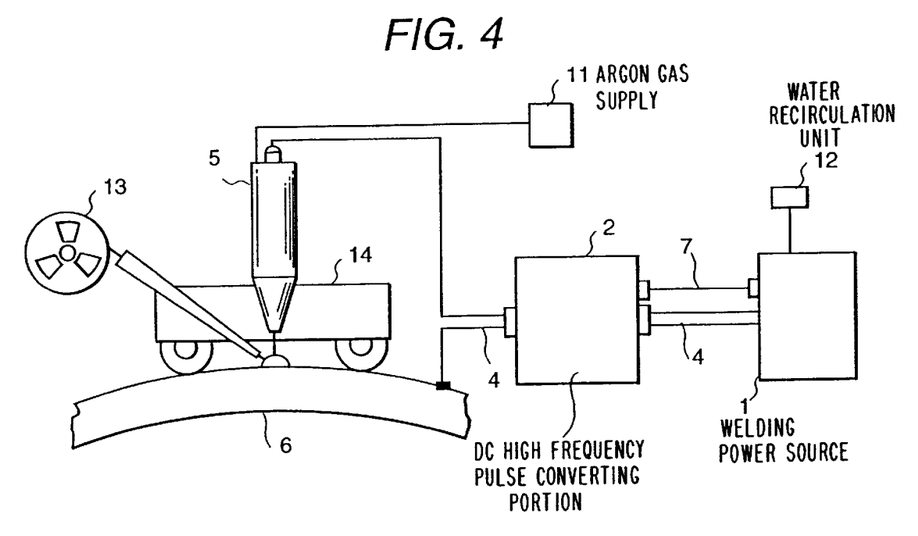
FIG. 4 is a schematic diagram showing the overall construction of a high frequency pulse arc welding apparatus in accordance with the present invention.
Figure 5:
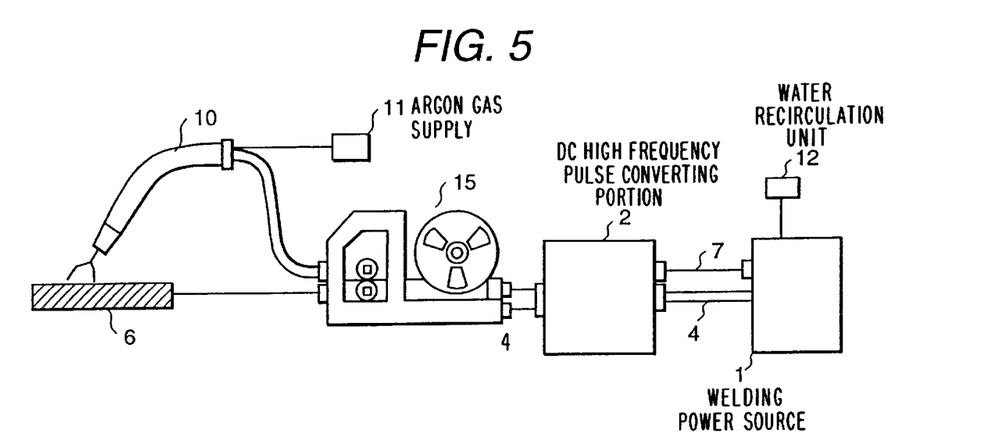
FIG. 5 is a diagram showing a welding torch in accordance with the present invention.

FIG. 4 shows the construction of a high frequency pulse TIG welding apparatus in accordance with the present invention. A TIG torch 5 and a TIG wire supply unit 13 are mounted on a movable cart 14 moving on the periphery of an object to be welded 6, such as a pipe. Argon gas for shielding the arc portion is supplied to the welding torch 5 from an argon gas supply 11. A cooling water recirculation unit 12 operates as a cooling unit for preventing overheating of the welding AC power source 1 providing a voltage of 200 V, the semiconductor unit of the DC high frequency pulse converting portion 2, and the welding torch 5. Cooling water also is recirculated through the coaxial cable 4, which is of a size capable of allowing water to flow. Control of the high frequency pulse current is performed by means of a control signal supplied from the welding power source 1 which controls the semiconductors of the DC high frequency pulse converting portion 2 through a control signal cable FIG. 5 shows the construction of a high frequency pulse MIG welding apparatus. The construction of this high frequency pulse MIG welding apparatus is the same as that of FIG. 4 except for a MIG torch 10 and a MIG wire supplying unit 15. Automatic welding can be performed by mounting the MIG torch 10 for movement.

Figure 6:
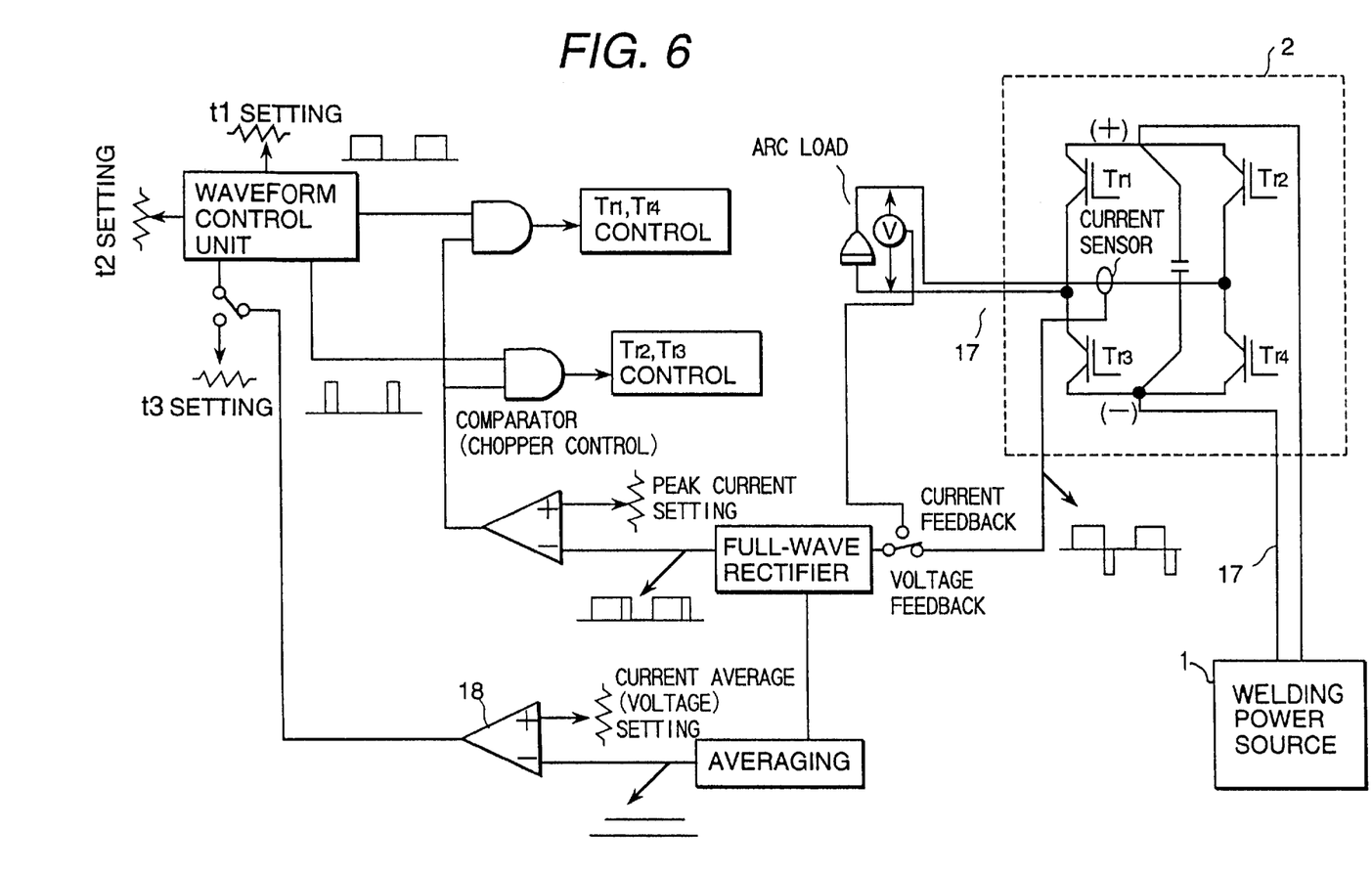
FIG. 6 is a schematic diagram showing the construction of a waveform control power source of the high frequency pulse arc welding apparatus in accordance with the present invention.

FIG. 6 is a schematic diagram showing the construction of a waveform control power source. The reference character 17 indicates a cable having an inductance which is reduced by closely attaching positive and negative cables having a length of approximately 50 m to each other, and the reference character 18 indicates an adder for performing feedback control of the average current by changing the current conducting time period t3. The current feedback is used for the TIG welding, and the voltage feedback is used for the MIG welding.

Embodiment 2

Figure 7:
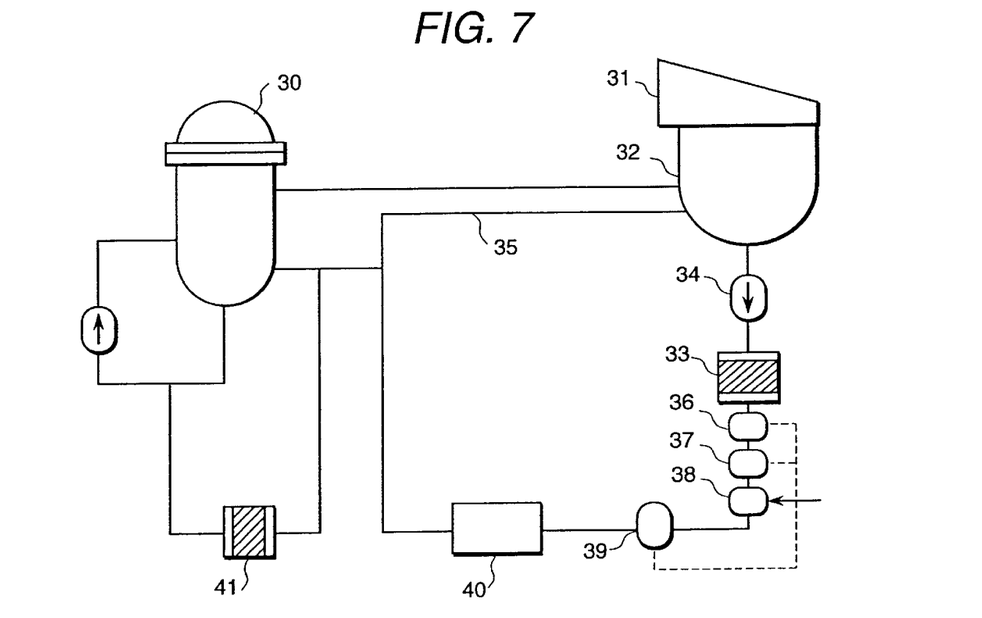
FIG. 7 is a schematic diagram showing a nuclear power plant.
Figure 8:
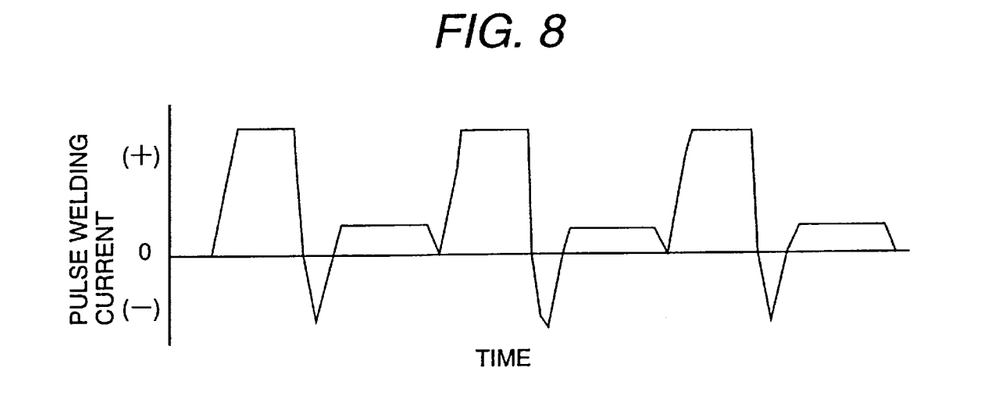
FIG. 8 is a waveform diagram showing a modification of the waveform of a high frequency current pulse in accordance with the present invention.
Figure 9:
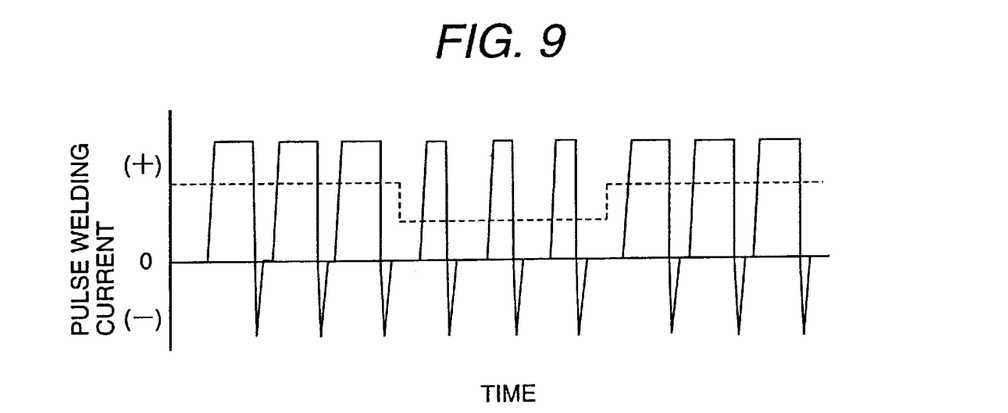
FIG. 9 is a waveform diagram showing a modification of the waveform of a high frequency current pulse in accordance with the present invention.

FIG. 7 is a schematic diagram showing the system of a BWR power plant having a butt welding structure in accordance with the present invention. Referring to the figure, the reference character 30 denotes a nuclear reactor, the reference character 31 denotes a turbine, the reference character 32 denotes a condenser, the reference character 33 denotes a condensate demineralizer, the reference character 34 denotes a low pressure condensate water pump, the reference character 35 denotes a feed water recirculation line, the reference character 36 denotes an electric conductivity detector, the reference character 37 denotes a dissolved oxygen concentration meter, the reference character 38 denotes an injector for oxygen or an inert gas or an alkali agent, the reference character 39 denotes a pH meter, the reference character 40 denotes a feed water heater, and the reference character 41 denotes a reactor water clean-up system. Pipes made of austenitic steel of SUS 304L or SUS 316L are used for the primary cooling system piping of the nuclear reactor 30, but pipes made of a carbon steel or a low alloy steel are used for the other piping. In this embodiment, pipes made of the carbon steel or the low alloy steel were joined with the same weld edge groove and in the same welding method as those of Embodiment 1. The result showed that stress release annealing after welding could be eliminated. That is, the remaining stress was so small that the pipes could be used after being welded as they were.

Further, the primary cooling system pipes were welded using the same method as Embodiment 3, which will be described below.

Embodiment 3

When the structure of a joined portion has grown large grains, there are some cases where the boundary between the base metal and the joined portion cannot be clearly detected by ultrasonic wave inspection. Prevention of grain growth will be described below, as an example of one application of the present invention. A welding test was conducted under the following conditions. The welding method was TIG welding with a wire supply; the base metal was austenitic steels of SUS 304L and SUS 316L; the plate thickness was 30 mm; the V-shaped weld edge groove had a bevel angle of 30 degrees; and the welding load voltage was 120 V. While the welding peak current and the time period were kept constant at 600 A and 79 $\mu$sec, respectively, the current conducting time periods were alternately switched between t1 of 50 $\mu$sec, t2 of 4 $\mu$sec, t3 of 25 $\mu$sec on the one hand, and t1 of 20 $\mu$sec, t2 of 4 $\mu$sec, t3 of 55 $\mu$sec on the other hand. The weld result was that the average current (average arc pressure) was varied in synchronism with the switching period and the molten weld metal was stirred corresponding to this variation to prevent grain growth of the weld metal. The current changing rate at the rise time and the fall time of the pulse in this embodiment was similar to that in Embodiment 1. The reverse current was one half of the peak current. Vibration of the high frequency pulse current also accelerated the prevention of grain growth. An inspection result of the test piece welded under the foregoing conditions showed that the joined portion and the base metal could be discriminated more clearly than those welded by the conventional TIG welding method. The above test was conducted by varying the current conducting time period (t1) of the main peak current in order to change the average current (average arc pressure), while the switching time period was kept constant. However, the same effect can be obtained by periodically varying the base current in the current conducting time period t3 or the peak current of the main current.

Embodiment 4

An example of the welding of aluminum with a deep melting penetration will be described below. Since the polarity is reversed in the high frequency pulse current waveform in accordance with the present invention, aluminum can be welded because the base metal is cleaned and the oxide film is removed by positive argon ions when the base metal to be joined is at a negative polarity. The cleaning effect is higher as the time period when the base metal is at a negative polarity is made longer. However, the depth of penetration is shallow and the consuming rate of the tungsten electrode is large. Therefore, the depth of penetration can be increased by shortening the time period of the base metal at negative polarity and lengthening the time period of the base metal at positive polarity within a range capable of the metal being welded. A welding test was conducted under the following conditions. The base metal to be joined was aluminum plate; the plate thickness was 6 mm; the joining was an I-butt joining; the electrode was a tungsten electrode of 4 mm diameter; the welding load voltage was 120 V; and the welding peak current was 500 A. The current conducting time periods were t1 of 30 $\mu$sec, t2 of 3 $\mu$sec, t3 of 20 $\mu$sec, and the welding speed was 200 cm/min. The welding result showed that welding could be performed by a once-through pass with good wave beads on the reverse side. The current changing rate at the rise time and the fall time of the pulse in this embodiment was similar to that described previously. A conventional alternating current welding having a cleaning action can perform welding by decreasing the welding speed to 150 cm/min. However, there is a disadvantage in that the beads become wider in width in the heat affected portion. Further, a welding test was conducted by setting the power source condition to a constant voltage condition and by changing the tungsten electrode to a tungsten wire. The result showed that a high speed welding could be performed at the same speed as described above.

Embodiment 5

Figure 10:
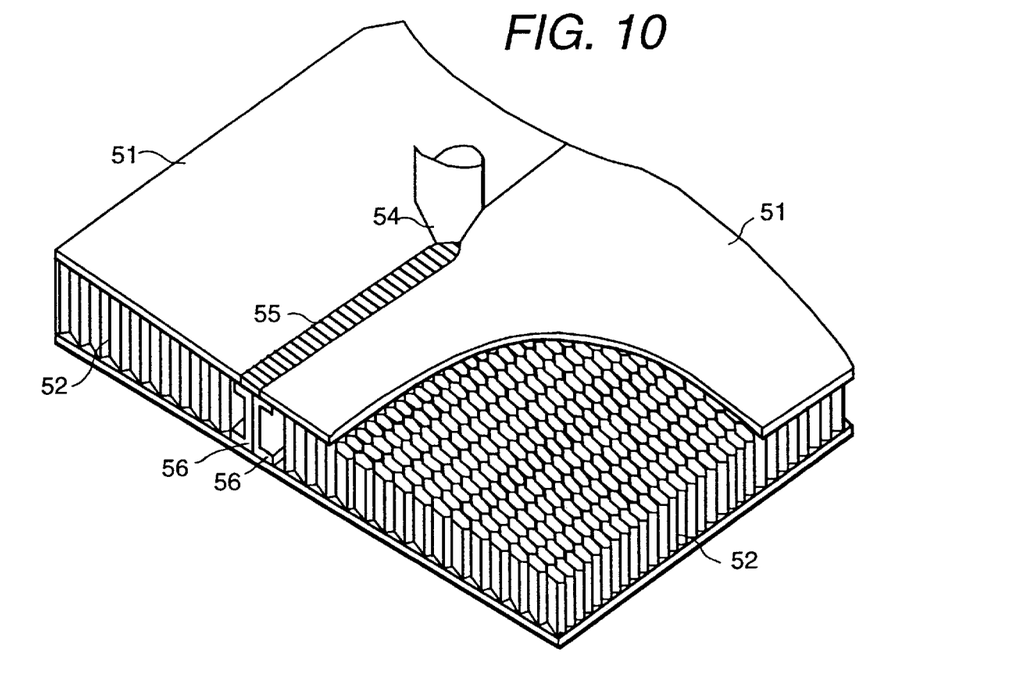
FIG. 10 is a perspective view showing a welded structure of honeycomb panels.

FIG. 10 is a perspective view showing a welded structure of honeycomb panels used for a car body of a rail car which is butt welded using the same method as in Embodiment 4. The honeycomb panel is constructed by joining a surface plate 51 made of an aluminum alloy, a core member 52 made of an aluminum alloy and a frame member 56 made of an aluminum alloy with solder. The honeycomb panels were joined through the frame members 56 by forming welded portions 55 in the form of a narrow edge groove in the obverse and reverse sides using a welding torch 54 under the same welding condition as described above. In this embodiment, the honeycomb panels were joined by MIG welding. The filler used had the same composition as that of the base metal, the weld edge groove was I-shaped, and the gap of the weld edge groove was 3 mm.

Figure 11:
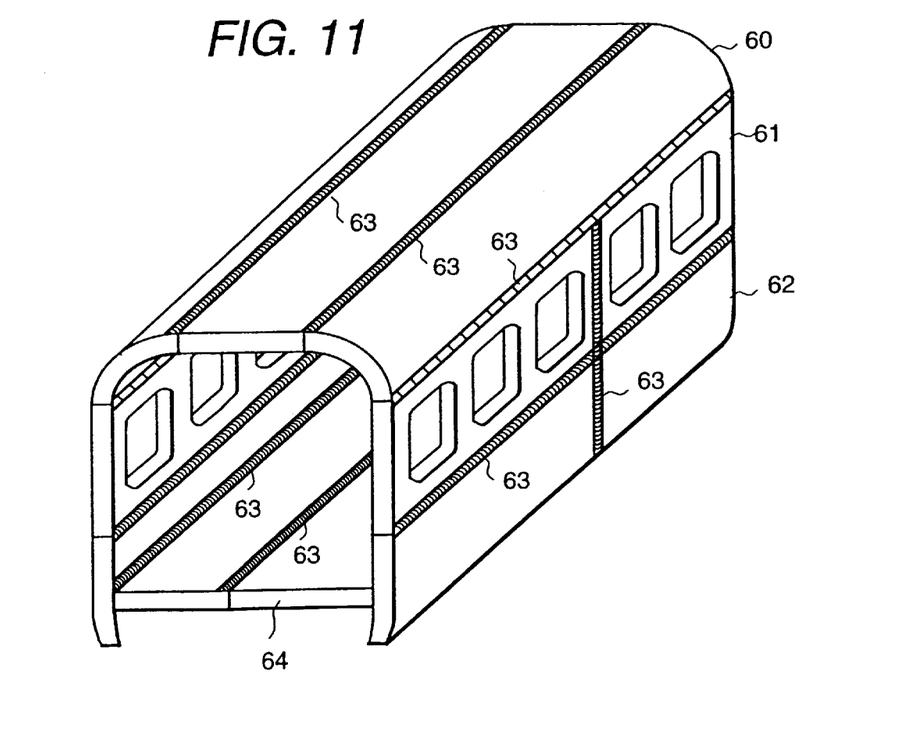
FIG. 11 is a perspective view showing a welded structure of a rail-car body.

FIG. 11 is a perspective view showing a car body of the rail/car assembled by using the welding method in accordance with the present invention. The main car body is composed of ceiling boards 60, car-body side walls 61, and floor boards 64 to form the car body, and these members are welded and assembled at welded portions 63 using the welding method of the present invention. The total length of the car body is 25 m.

According to the present invention, by use of the stiff (directive) arc which is obtained by the high frequency electromagnetic pinch force which eliminates the effect of the inductance of the welding cable, narrow edge groove welding can be stably performed without using a hydrogen containing mixed gas, of the type which tends to cause hydrogen embrittlement, as a shield. Further, by the cleaning action of the polarity reversing current, deep penetration welding of aluminum and high speed welding can be performed.

Since the effect of the inductance of the welding cable does not exist even at a place 50 m away from the welding power source, the present invention can be applied to maintenance welding by remote operation on a pipe in a nuclear plant.

Since grain growth can be prevented by varying the average current (arc pressure) by several Hz, the base metal and the joined portion can be clearly detected by ultrasonic wave inspection and, accordingly, the ultrasonic wave inspection can be easily performed.

The effect of the high frequency pulse can be obtained even if the present invention is applied to a carbon oxide gas arc weld or a shielded metal arc weld.

What is claimed is:

1. A method of high frequency pulse arc welding comprising the steps of:

generating an arc between (1) any one of an inconsumable electrode and a consumable electrode arranged near a portion of a base metal to be welded and (2) the base metal with a main pulse current; and when the main pulse current is shifted from ON to OFF, supplying a reverse pulse current having a polarity opposite to a polarity of the main pulse current between the electrode and the base metal to steepen rising and falling edges of the main pulse current and the reverse pulse current, thereby stiffening the arc;

wherein the step of supplying a reverse pulse current includes the step of applying a reverse pulse voltage having a peak voltage in a range of 80 to 200 V between the electrode and the base metal; and wherein a time period between a beginning of the main pulse current and a beginning of a next main pulse current following the reverse pulse current has a length in a range of 16 $\mu$sec to 350 $\mu$sec.

2. A method of high frequency pulse arc welding according to claim 1, further comprising the step of providing a current stopping period between the reverse pulse current and a main pulse current following the reverse pulse current.

3. A method of high frequency pulse arc welding according to claim 2, wherein the main pulse current, the reverse pulse current, a current conducting time period of the main pulse current, and the current stopping period can be independently varied.

4. A method of high frequency pulse arc welding according to claim 1, further comprising the step of supplying a base current smaller than the main pulse current between the electrode and the base metal during a period between the reverse pulse current and a main pulse current following the reverse pulse current.

5. A method of high frequency pulse arc welding according to claim 4, further comprising the steps of:

maintaining a peak value of the main pulse current constant; and periodically varying a current conducting time period of the main pulse current and a current conducting time period of the base current.

6. A method of high frequency pulse arc welding according to claim 5, further comprising the step of varying an average value of the main pulse current at a frequency in a range of several Hz to several tens of Hz to stir molten metal at the portion of the base metal to be welded to prevent grain growth.

7. A method of high frequency pulse arc welding according to claim 6 wherein the peak value of the main pulse current, a peak value of the reverse pulse current, the base current, the current conducting time period of the main pulse current, and the current conducting time period of the base current can be independently varied.

8. A method of high frequency pulse arc welding according to claim 1, wherein structural parts are welded by forming a weld metal of at least one of aluminum, aluminum base alloys, carbon steels, and low-alloy steels inside an I-shaped weld groove having a gap not larger than 6 mm.

9. A method of high frequency pulse arc welding according to claim 8, wherein the structural parts form a butt welded structure.

10. A method of high frequency pulse arc welding according to claim 8, wherein the structural parts form a rail-car body structure made of aluminum alloy.

11. A method of high frequency pulse arc welding according to claim 8, wherein the structural parts include pipes of a nuclear power plant which have a butt weld structure joined by forming the weld metal of one of carbon steels and low-alloy steels, the nuclear power plant including a nuclear reactor, a steam turbine, a condenser, and a condensate demineralizer, the pipes being connected to the nuclear reactor, the steam turbine, the condenser, and the condensate demineralizer and being made of one of carbon steels and low-alloy steels.

12. A method of high frequency pulse arc welding comprising the steps of:

generating an arc between (1) an inconsumable electrode arranged near a portion of a base metal to be welded and (2) the base metal with a main pulse current while supplying a filler wire between the electrode and the base metal; and when the main pulse current is shifted from ON to OFF, supplying a reverse pulse current having a polarity opposite to a polarity of the main pulse current between the electrode and the base metal to steepen rising and falling edges of the main pulse current and the reverse pulse current, thereby stiffening the arc;

wherein the step of supplying a reverse pulse current includes the step of applying a reverse pulse voltage having a peak voltage in a range of 80 to 200 V between the electrode and the base metal; and wherein a time period between a beginning of the main pulse current and a beginning of a next main pulse current following the reverse pulse current has a lenath in a range of 16 $\mu$sec to 350 $\mu$sec.

13. A method of high frequency pulse arc welding according to any one of claims 1 to 12, wherein in a method of welding structural parts made of any one of aluminum and aluminum base alloys, a cleaning action and a stiff arc are produced by varying any one of (1) a ratio of a current conducting time period of the main pulse current to a current conducting time period of the reverse pulse current and (2) a ratio of a peak current of the main pulse current to a peak current of the reverse pulse current to make deep melting penetration welding and high speed welding possible.

14. A method of high frequency pulse arc welding according to claim 13, wherein a rise time and a fall time of the main pulse current are not longer than 50 $\mu$sec.

15. An apparatus for high frequency pulse arc welding by which welding is performed by generating an arc between (1) any one of an inconsumable electrode and a consumable electrode arranged near a portion of a base metal to be welded and (2) the base metal with a main pulse current, the apparatus comprising:

a welding power source which generates a direct current;

a high frequency converter, including four IGBT elements, which converts the direct current generated by the welding power source to a high frequency pulse current which is supplied between the electrode and the base metal; and a control unit which controls the high frequency converter to supply a main pulse current having a polarity opposite to a polarity of the direct current generated by the welding power source between the electrode and the base metal; and when the main pulse current is shifted from ON to OFF, controls the high frequency converter to supply a reverse pulse current having a polarity opposite to a polarity of the main pulse current between the electrode and the base metal to steepen rising and falling edges of the main pulse current and the reverse pulse current, thereby stiffening the arc;

wherein the control unit controls the welding power unit and the high frequency converter to apply a reverse pulse voltage having a peak voltage in a range of 80 to 200 V between the electrode and the base metal to supply the reverse pulse current between the electrode and the base metal; and wherein the control unit controls the high frequency converter so that a time period between a beginning of the main pulse current and a beginning of a next main pulse current following the reverse pulse current has a length in a range of 16 $\mu$sec to 350 $\mu$sec.

16. An apparatus for high frequency pulse arc welding according to claim 15, wherein the welding power source and the high frequency converter are physically separated from one another; and wherein the apparatus further comprises:
a welding torch including the electrode;
a welding cable connecting the welding torch to the high frequency converter; and
any one of a welding cable and a coaxial cable connecting the high frequency converter to the welding power source and having a length longer than a length of the welding cable connecting the welding torch to the high frequency converter.

* * * * *